Figure 1:
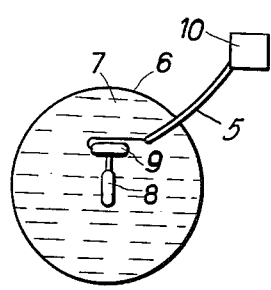

May 7, 1963  E. WEINBRENNER ETAL  3,088,172
PROCESS FOR THE PRODUCTION OF MOLDED CELLULAR
POLYURETHANE PLASTICS
Filed May 10, 1957

INVENTORS:
ERWIN WEINBRENNER, PETER HOPPE, KARL BREER,
BY

ATTORNEY

United States Patent Office 3,088,172
Patented May 7, 1963

3,088,172
PROCESS FOR THE PRODUCTION OF MOLDED CELLULAR POLYURETHANE PLASTICS
Erwin Weinbrenner, Leverkusen, Peter Hoppe, Troisdorf, and Karl Breer, Cologne-Flittard, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed May 10, 1957, Ser. No. 658,263
Claims priority, application Germany May 12, 1956
6 Claims. (Cl. 18—48)

This invention relates to a process for preparing polyurethane plastics. More particularly, the invention is concerned with a process wherein a liquid reactive mixture capable of forming a polyurethane plastic is treated in such manner as to vary the size, configuration and density of the solidified plastic material obtained therefrom.

It is well known to eject plastic materials into a gaseous or liquid medium in order to produce certain desired effects on the surface of the finished product. However, heretofore no process has become known wherein the properties of the plastic material are basically affected by the medium into which it is ejected. In all heretofore known ejection processes, the plastic material enters the gaseous or liquid medium into which it is introduced in the form of a coherent mass so that the changes, if any, brought about by the surrounding medium are restricted to the surface of the plastic obtained.

It is an object of the present invention to provide a process for preparing plastics wherein the properties of said plastics can be affected in a desired manner. Another object of the present invention is to provide a process for producing polyurethane plastics wherein certain desired properties can be imparted to the end product without changing the formulation of the reactive mixture serving to produce said polyurethane plastics. A further object of the invention is to provide a process which permits the production of polyurethane plastics of different properties and particularly the size, configuration and density, starting from one and the same mixture of components. Still further objects will appear hereinafter.

These objects are accomplished in accordance with the present invention by providing a method of molding cellular polyurethane elements by submerging a substantially deflated, elastic, dilatable, hollow body in a liquid to a depth to form a molded element having a predetermined size, configuration and density and introducing into the body a mixture of the reactive components of a cellular polyurethane plastic. The reaction mixture then expands against the pressure of the liquid on the hollow body. The foamable mixture produced in a suitable mixing device can, according to the present invention, be introduced into the hollow body in intermittent portions, but more preferably in a continuous and coherent jet. It is preferred to use a foam formulation which allows quick foaming in order to have a quick expanding foam mass when introduced, for instance, in a liquid medium.

The liquid reactive mixtures capable of forming polyurethane plastics which are used in the practice of the invention may be prepared from the components commonly utilized in the production of polyurethane plastics, i.e., (1) organic compounds having at least two reactive hydrogen atoms, (2) organic polyisocyanates, and (3) cross-linkers (chain extenders) and/or accelerators. If the organic compound containing at least two reactive hydrogen atoms is a polyol, such as an hydroxyl polyester of the alkyd type or an hydroxyl polyether, and if the product desired is a polyurethane foam, a small amount of water is added to the above components.

To prepare the liquid reactive mixture of the components, the latter may be brought together by any suitable means, such as mechanical agitation, but a particularly uniform reactive mixture is obtained if one or more of the components are injected into a continuous stream of the other component(s) as described in U.S. Patent 2,764,565 to P. Hoppe et al. The mixing operation is preferably carried out in a movable mixing head which can be taken to the place where the liquid reactive mixture of the components is to be processed.

In carrying out the process of the invention, the liquid mixture of the reactants capable of forming a polyurethane plastic is introduced into an elastic hollow body submerged beneath the surface of a liquid.

The process of the invention is particularly suitable for the production of molded elements, in particular, spherical bodies, having desired dimensions and a desired density. In this embodiment, a liquid reactive mixture capable of forming a polyurethane foam is introduced into a dilatable hollow element consisting of rubber, polyvinyl chloride or another elastic material which is submerged in a liquid, such as water. The dilatable hollow element may contain a chemical influencing the reactions leading to the formation of polyurethane foam and is connected to a mixing apparatus in which a liquid mixture of the components of said polyurethane foam is prepared. When the liquid foamable mixture is introduced into the hollow body, a solid polyurethane foam is formed therein, the density, shape and size of the foam being controlled by the pressure of the liquid in which the foaming operation is carried out. This pressure may be within the range of about 0.5 to about 15 atmospheres. In this manner, there may be produced spherical bodies, rings of all types with circular cross sections, life belts and tires filled with a foamed core, such as special safety tires and bulletproof tires.

The invention is further illustrated by the drawing in which

Figure 2:
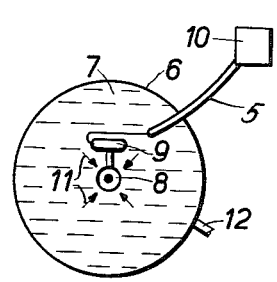

FIGURES 1 and 2 show the production of a spherical body by the process of the invention.

Referring more particularly to the drawing, the hand nozzle appliance 9 is water-tight and capable of being operated under water. The appliance is connected by a hose 5 to the mixing apparatus 10.

A container 6 is filled with water 7. The hollow body 8 is connected to the hand nozzle 9 in the water tank and the hand nozzle in turn is connected to the mixing apparatus 10 by a rigid or flexible hose. When introducing a reactive foamable mixture into the hollow body 8, the mixture foams therein, thus expanding the hollow body 8, for example, to a spherical form. The size and density of the foam which is formed in body 8 is determined by the pressure 11 of the liquid which is controlled by the overflow valve 12.

Representative examples of organic compounds having at least two reactive hydrogen atoms which are commonly used in the production of polyurethane plastics include polyesters of the alkyd type, polyalkylene ether glycols and hydrogenation products of olefin-carbon monoxide copolymers which all contain terminal hydroxyl groups and have molecular weights within the range of about 500 to 10,000. Among the commonly employed polyisocyanates are the phenylene diisocyanates, the toluylene diisocyanates, p,p'-diphenylmethane diisocyanate and the naphthylene diisocyanates. Cross-linking agents which are frequently utilized in the production of polyurethane plastics include water, glycols and diamines, while as examples of accelerators there may be mentioned tertiary amines and heavy metal compounds. In many cases, emulsifiers, such as high molecular alkyl sulfates or sulfonates, amine salts of high molecular fatty acids, and high molecular alkoxylation products of suitable hydroxyl compounds are included in the formulation in order to facilitate mixing of the reactants.

In preparing the liquid reactive mixtures capable of forming a polyurethane plastic, the known formulations for making polyurethane plastics are employed. Thus, when making polyurethane foam, there are ordinarily used 0.6 to 10 mols of organic diisocyanate per one gram equivalent of reactive hydrogen contained in the organic compound having at least two reactive hydrogen atoms. Water, accelerator and emulsifier are employed in amounts of 0.5 to 5% by weight, 0.1 to 5% by weight and 0.5 to 10% by weight, respectively, based on the weight of the organic compound having at least two reactive hydrogen atoms. Whereas substantially linear compounds containing two reactive hydrogen atoms will react with diisocyanates to form elastic foams, rigid foams are obtained if a di- or triisocyanate is reacted with a branched compound having three or more reactive hydrogen atoms.

A rather substantial volume of literature has developed in the last ten years or so in connection with the production of polyurethane plastics. Among the earliest publications are a book entitled "German Plastics Practice" by De Bell et al. (1946), pages 316 and 463 to 465, and the articles by Otto Bayer in "Angew. Chemie." A59, 257 (1947), and "Modern Plastics" 25, 149 (1947). However, in order to provide sufficient detail with respect to specific starting materials that are especially useful to make polyurethane foam and rubber and at the same time achieve a certain degree of brevity herein, reference is made to U.S. Patents 2,620,516; 2,621,166; 2,729,618; 2,778,810; and 2,764,565 and to German Patent 929,507, the disclosure of which is hereby incorporated herein by reference.

In the following examples, specific formulations are set forth which may be used in the practice of the invention.

Example 1

The mixture of:

80 parts by weight of a polyester produced from—
    5 mols of adipic acid,
    1 mol of phthalic anhydride, and
    8 mols of hexanetriol,
20 parts by weight of a polyester produced from—
    1.5 mols of adipic acid,
    1 mol of hexanetriol, and
    1 mol of butanediol,
2 parts by weight of silica aerogel,
85 parts by weight of toluylene diisocyanate,
7 parts by weight of activator mixture, consisting of—
    4 parts by weight of sodium salt of a sulphonated castor oil containing 54% water and
    3 parts by weight of N-diethyl-β-phenoxyethal amine is prepared in a conventional mixing head and passed at a rate of 60 kg. per minute into an elastic body immersed in water. The foam produced has a bulk density of 25.0 kg. per m.³.

Example 2

The mixture consisting of the following ingredients is prepared in a mixing head.

80 parts by weight of polyester produced from—
    5 mols of adipic acid,
    1 mol of phthalic anhydride, and
    8 mols of hexanetriol,
20 parts by weight of polyester produced from—
    1.5 mols of adipic acid,
    1 mol of hexanetriol, and
    1 mol of butanediol,
2 parts by weight of silica aerogel,
85 parts by weight of toluylene diisocyanate,
7 parts by weight of activator mixture, consisting of—
    4 parts by weight of sodium salt of a sulphonated castor oil containing 54% water and
    3 parts by weight of N-diethyl-β-phenoxyethal amine.

The mixture is passed into a hollow elastic body containing trichlorethyl phosphate, the body being immersed in water. The foam body thus produced possesses in its outer parts an increase of flame-proofing agent and is therefore flame resistant.

While certain representative embodiments and details have been shown for the purpose of illustrating this invention, it will be apparent to those skilled in the art that various changes and modifications may be made therein without departing from the spirit and scope of the invention.

What is claimed is:

1. A process for the production of molded cellular polyurethane elements which comprises submerging a substantially deflated, elastic, dilatable, hollow body in a liquid to a depth to form a molded element having a predetermined size, configuration and density and introducing into said body a mixture of the reactive components of a cellular polyurethane plastic wherein reaction commences causing expansion of said body against the pressure exerted by said liquid.

2. A process for the production of molded cellular polyurethane elements which comprises submerging a substantially deflated, elastic, dilatable, hollow body in a liquid to a depth such that the pressure of said liquid on said body is from about 0.5 to about 15 atmospheres, and introducing a mixture of the reactive components of a cellular polyurethane plastic wherein reaction commences causing expansion of said body against the pressure exerted by said liquid to form a molded element having a predetermined size, configuration and density.

3. A process for the production of molded cellular polyurethane elements which comprises submerging a substantially deflated, elastic, dilatable, hollow body in a liquid to a depth to form a molded element having a predetermined size, configuration and density and introducing into said body a mixture of an organic compound containing active hydrogen atoms which are reactive with —NCO groups, an organic polyisocyanate and water wherein reaction commences causing expansion of said body against the pressure exerted by said liquid.

4. A process for the production of molded cellular polyurethane elements which comprises submerging a substantially deflated, elastic, dilatable, hollow body in a liquid to a depth such that the pressure of said liquid on said body is from about 0.5 to about 15 atmospheres and introducing into said body a mixture of an organic compound containing active hydrogen atoms which are reactive with —NCO groups, an organic polyisocyanate and water, wherein reaction commences causing expansion of said body against the pressure exerted by said liquid to form a molded element having a predetermined size, configuration and density.

5. A process for the production of molded cellular polyurethane elements which comprises submerging a substantially deflated, elastic, dilatable, hollow body in a liquid to a depth to form a molded element having a predetermined size, configuration and density and introducing into said body a mixture of an organic compound containing active hydrogen atoms which are reactive with —NCO groups and selected from the group consisting of hydroxyl polyesters prepared by the process which comprises reacting a polyhydric alcohol and a polycarboxylic acid, polyesteramides and polyalkylene ether glycols, an organic polyisocyanate and water, wherein reaction commences causing expansion of said body against the pressure exerted by said liquid.

6. A process for the production of molded cellular polyurethane elements which comprises submerging a substantially deflated, elastic, dilatable, hollow body in a liquid to a depth such that the pressure of said liquid is from about 0.5 to about 15 atmospheres and introducing into said body a mixture of an organic compound containing active hydrogen atoms which are reactive with —NCO groups and selected from the group consisting of hydroxyl polyesters prepared from polyhydric alcohols and polycarboxylic acids, polyesteramides and polyalkylene ether glycols, an organic polyisocyanate and water, wherein reaction commences causing expansion of said body against the pressure exerted by said liquid to form a molded element having a predetermined size, configuration and density.

References Cited in the file of this patent

UNITED STATES PATENTS

| | | |
|---|---|---|
| 2,576,749 | Carpentier | Nov. 27, 1951 |
| 2,577,281 | Simon et al. | Dec. 4, 1951 |
| 2,657,151 | Gensel et al. | Oct. 27, 1953 |
| 2,690,987 | Jeffries et al. | Oct. 5, 1954 |
| 2,721,811 | Dacey et al. | Oct. 25, 1955 |
| 2,726,219 | Hill | Dec. 6, 1955 |
| 2,764,565 | Hoppe et al. | Sept. 25, 1956 |
| 2,767,461 | Lebold et al. | Oct. 23, 1956 |
| 2,850,467 | Livingood | Sept. 2, 1958 |
| 2,888,409 | Bender et al. | May 26, 1959 |
| 2,898,626 | Alderfer et al. | Aug. 11, 1959 |
| 2,907,074 | Rhodes | Oct. 6, 1959 |
| 2,957,852 | Frankenburg et al. | Oct. 25, 1960 |
| 2,968,575 | Mallonee | Jan. 17, 1961 |

FOREIGN PATENTS

| | | |
|---|---|---|
| 995,768 | France | Aug. 22, 1951 |
| 839,092 | Germany | May 15, 1952 |
| 721,896 | Great Britain | Jan. 12, 1955 |